United States Patent [19]
Shaw

[11] 3,813,468
[45] May 28, 1974

[54] ELECTRODES FOR GLASS FURNACES

[75] Inventor: Gordon Brian Shaw, Sheffield, England

[73] Assignee: Pickford Holland & Company Limited, Sheffield, England

[22] Filed: May 30, 1973

[21] Appl. No.: 365,290

[30] Foreign Application Priority Data
June 11, 1972 Great Britain............... 27775/72

[52] U.S. Cl.................................. 13/6, 339/267
[51] Int. Cl............................................ C03b 5/02
[58] Field of Search ............... 13/6, 18; 174/199; 339/267, 268, 270 R, 273

[56] References Cited
UNITED STATES PATENTS
1,515,755   11/1924   Rohde et al. ............... 174/199 X
2,556,089   6/1951   James et al. ............... 339/270 R X
3,391,237   7/1968   Penberthy........................... 13/6

Primary Examiner—Roy N. Envall, Jr.
Attorney, Agent, or Firm—Lowe, King and Price

[57] ABSTRACT

A ceramic electrode for glass furnaces comprises an electrode body having one or more longitudinal holes there being inserted in the or each hole expandable tube means formed from electrically conductive material there being further means passing along the expandable tube capable of movement relative to the tube to effect expansion of the tube whereby the tube is brought into intimate contact with the electrode, said tube and said movable means extending out of the electrode to means capable of effecting the relative movement, the tube being connected to a source of electrical power.

11 Claims, 2 Drawing Figures

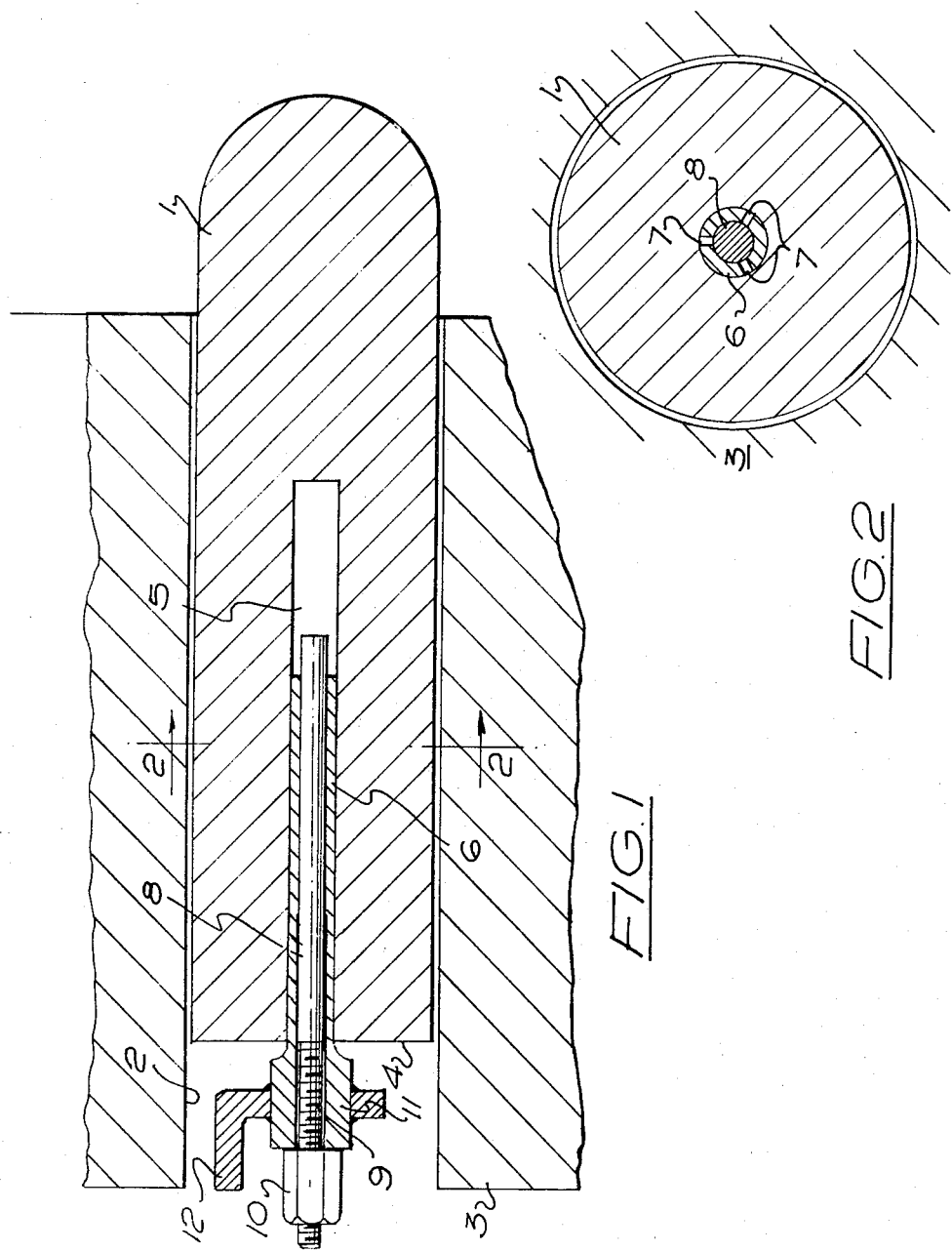

ELECTRODES FOR GLASS FURNACES

This invention relates to electrodes for glass furnaces and is particularly concerned with ceramic electrodes, and more particularly tin oxide electrodes, and the provision of efficient electrical connection to the electrode.

Tin oxide electrodes are used for introducing the electric power into glass, particularly lead glass, during electric melting. The electrodes may be used in the main part of a tank furnace or in other parts of the furnace, e.g., throat, rise or forehearth. They can be used where electricity is the sole source of power or as boosters in furnaces fired by other sources of energy. Tin oxide appears to be the most suitable electrode material for melting lead glasses, since, unlike materials such as molybdenum and graphite, it does not reduce the lead oxide to lead. Furthermore, it does not colour the glass significantly.

Tin oxide as normally produced commercially, contains small quantities of additives to promote electrical conduction and sinterability. However, although the electrical conductivity is high at glass melting temperatures it is generally much lower at lower temperatures. Experiments have shown that, for tin oxide large currents can only be conducted efficiently above about 600°–800°C. A difficulty arises, therefore, in making an electrical connection to an electrode passing through a furnace wall where, although one end is immersed in molten glass at relatively high temperatures, the other end is relatively cool. Passage of high currents through low temperature regions of tin oxide causes self heating of the electrode which can cause spalling under certain circumstances. Further, the dissipation of power by self-heating is inefficient and can lead to other problems such as glass leaking back through the annulus between the electrode and the furnace wall.

Previous methods of overcoming this problem have usually involved by-passing the low conductivity zone of the electrode by applying a silver layer to the outside of the electrode to carry current to positions on the electrode where the ambient temperature is approaching the melting temperature of silver (about 961°C.) at which position the temperature of the electrode is such as to allow it to conduct electricity. However, such construction has the disadvantage that, for reasons that are not fully understood, the silver layer after long periods of use becomes discontinuous even at the low temperature regions and becomes ineffective in carrying current. An alternative construction is to pass silver rods into holes in the electrode, when reliance must be placed on the end of the rod becoming molten to ensure good electrical contact with the electrode.

The object of the invention is to provide a ceramic electrode, particularly a tin oxide electrode, with improved means for providing electrical connection with a source of supply.

According to the present invention, a ceramic electrode for glass furnaces comprises an electrode body having one or more longitudinal holes there being inserted in the or each hole expandable tube means formed from electrically conductive material there being further means passing along the expandable tube capable of movement relative to the tube to effect expansion of the tube whereby the tube is brought into intimate contact with the electrode, said tube and said movable means extending out of the electrode to means capable of effecting the relative movement, the tube being connected to a source of electrical power. Preferably the means within the tube is also formed from electrically conductive material when it can provide an alternative connection to a source of electrical power.

The tube may be of material that is inherently sufficiently deformable as to allow expansion by the means within the tube to force the tube into intimate contact with the electrode. This, however, has the slight disadvantage that at operating temperatures there will be continued thermal expansion of the tube that could lead to rupture of the electrode. Therefore it is desirable that the tube be split longitudinally to provide any convenient number of longitudinal slits in the tube which slits serve to facilitate the initial mechanical expansion of the tube and can take up the expansion that takes place under operating conditions. If a material is utilised for the tube that is not readily deformable at operating temperatures i.e., stainless steel, the expansion gaps provided by splitting the tube may not be sufficient to compensate for the expansion that will occur across the depth of the tube. Therefore, with such materials the means within the tube can be split to compensate for such expansion.

The means within the tube may be a tapered pin, and the relative movement between the tapered pin and the tube may be effected by withdrawing the pin into the tube or by holding the pin stationary and forcing the tube along the pin. In either case, co-operation between the tapered pin and an internally tapered section of the tube affects the required expansion of the tube. The relative movement may be a simple push or pull action effected by screw and nut means associated with the pin and the tube outside the electrode, or alternatively the tube may be internally threaded and tapered and the pin externally threaded on its tapered section so that relative movement between the tube and the pin can be effected.

As far as the materials of the tube and the means within the tube are concerned, these may be chosen in accordance with the known or predicted conditions under which the electrode is to operate. Therefore, the means according to the invention may be made from any suitable conductive material such as copper, stainless steel, copper-nickel, nickel alloys, or any other metal or alloy with high electrical conductivity and reasonable heat resisting properties could be used providing, of course, that it is compatible with tin oxide, the preferred ceramic, under operating conditions.

The advantages of the invention can therefore readily be appreciated. The electrical connection is internally of the electrode thereby avoiding the inherent disadvantage of externally silvered electrodes, and because there is no desire or necessity to have the end of the connecting means melt at operating temperatures to provide intimate contact with the electrode inherent disadvantages of such constructions are avoided.

While the basic construction provides the electrical connection internally of the electrode up to a point along its length at which it is reasonable to expect the ceramic material to be itself electrically conductive at operating temperatures, it may be desirable in certain circumstances to extend the hole through the electrode beyond the depth necessary to receive the connection means themselves and to a point closer to the operative end of the electrode, the inside of the hole being silvered from its internal end to beyond the inner extremity of the connection means themselves, it having been found that an internal silver layer is not destroyed as is an external layer.

One embodiment of the invention will now be described by way of example only, with reference to the accompanying drawings, in which:

FIG. 1 is a sectional side elevation of a tin oxide electrode according to the invention in position in an electrode hole through a furnace wall; and, FIG. 2 is a section generally on the line II—II of FIG. 1.

A ceramic electrode 1 formed from tin oxide is formed as an elongate body of circular cross-section adapted as shown to be inserted in an electrode hole 2 in a furnace wall 3 such that one end lies beyond the inner face of the furnace wall. The opposite end 4 is plain and a longitudinal hole 5 extends along the electrode body from that end. Into the hole 5 is inserted a sleeve 6 formed from copper, the copper sleeve being split along its length from its inner end, there being e.g., three slits 7. Within the copper tube lies a tapered stainless steel pin 8, the outer end 9 of the pin 8 being threaded and there being a brass nut 10 on the threaded end. The outer end of the sleeve 6 is provided with a collar 11 to which is secured a contact 12 to be secured to a source of electrical supply.

Thus, with the sleeve and pin assemblied and inserted into the hole, the nut 10 is screwed down the threaded portion 9 of the pin until such time as the nut abuts the collar 11, further screwing of the nut 10 then causing the tapered pin 8 to be retracted along the tube 6 and consequently cause expansion of the tube by virtue of the slits 7 whereby the sleeve is urged into intimate and positive contact with the inner face of the longitudinal hole 5. The slots also serve to take up expansion of the tube during service and thereby avoid the possibility of the expansion of the tube rupturing the electrode. With the contact 12 coupled to a source of electrical supply the electrode is then raady for use.

Particularly when tin oxide is the material of the electrode or when the electrode is of a generally similar material which only conducts electricity over a set temperature, it is important that the contact belween the copper tube 6 and the electrode is at a position along the length of the electrode where it is known that the conditions within the furnace will be such that at that point the electrode will have a temperature in excess of that at which it will conduct electricity. However, to ensure that electricity is conducted to the end of the electrode the longitudinal hole may extend further along the electrode than the tube and the inside face of the hole provided with a layer of silver extending from the inner end of the hole to a point along the length of the hole beyond the end of the tube 6.

What I claim is:

1. A ceramic electrode for glass furnaces comprising an electrode body having a longitudinal hole, there being inserted in the hole an expandable tube formed from electrically conductive material, there being further means passing through the expandable tube capable of relative movement to the tube to effect expansion of the tube for bringing the tube into intimate electrical contact with the electrode body, and said movable means extending out of the electrode body to means for effecting the relative movement.

2. A ceramic electrode as in claim 1, wherein the means within the tube is formed from electrically conductive material.

3. A ceramic electrode as in claim 1 wherein the tube is of a material that is inherently sufficiently deformable as to allow expansion by the means within the tube to force the tube into intimate contact with the electrode.

4. A ceramic electrode as in claim 1 wherein the tube has longitudinal slit means for enabling mechanical expansion of the tube in response to said relative movement while taking up any thermal expansion of the tube.

5. A ceramic electrode as in claim 1, wherein the means the tube is split to compensate for thermal expansion of the tube in use.

6. A ceramic electrode as in claim 1, wherein the means within the tube is a tapered pin.

7. A ceramic electrode as in claim 6 wherein the means for effecting relative movement comprises screw and nut means associated with the pin and the tube outside the electrode body.

8. A ceramic electrode as in claim 6 wherein the means for effecting relative movement comprises an external thread on said pin.

9. A ceramic electrode as in claim 1, wherein the material of the electrode is tin oxide.

10. A ceramic electrode as in claim 1, wherein the material of the tube is selected from the group consisting of copper, stainless steel, copper-nickel, and nickel alloys.

11. The apparatus of claim 1 wherein said means passing through the tube comprises means for bringing the tube into intimate contact with the electrode body along the substantially entire length of the tube within the electrode body.

* * * * *